United States Patent [19]

Rhyins et al.

[11] 4,220,978
[45] Sep. 2, 1980

[54] ELECTRO-OPTICAL DOCUMENT READER

[75] Inventors: Richard W. Rhyins, Ridgefield; Antoon M. Hurkmans, Bethlehem, both of Conn.

[73] Assignee: Burroughs Corporation, Detroit, Mich.

[21] Appl. No.: 813,946

[22] Filed: Jul. 8, 1977

[51] Int. Cl.² .............................................. H04N 1/10
[52] U.S. Cl. ................................... 358/293; 358/200; 358/225; 358/901
[58] Field of Search .............. 358/200, 199, 901, 285, 358/294, 225, 293; 355/71

[56] References Cited

U.S. PATENT DOCUMENTS

| | | |
|---|---|---|
| 3,183,815 | 5/1965 | Kapany et al. .................. 358/901 |
| 3,278,681 | 10/1966 | Larue, Jr. ........................ 358/294 |
| 3,317,738 | 5/1967 | Piepenbrink et al. ............ 358/901 |
| 3,430,057 | 2/1969 | Genahr ........................... 358/200 |
| 3,623,810 | 11/1971 | Ogawa et al. .................... 355/67 |

*Primary Examiner*—John C. Martin
*Assistant Examiner*—Edward L. Coles
*Attorney, Agent, or Firm*—Kevin R. Peterson; Robert A. Green; Edward J. Feeney, Jr.

[57] ABSTRACT

The disclosure is of apparatus including a duct-like light guide having an inlet end and an outlet end, light source means at the inlet end, a document at the outlet end, an optical reading system for receiving light reflected from the document, and electronic circuit means for converting the reflected light to electrical signals. Typically, the optical reading system has non-uniform light transmission characteristics, and, with one type of lens system, there is fall-off in intensity at the ends of the system. To compensate for this fall-off, the light source means is designed and positioned to provide a corresponding non-uniform light distribution so that the net effect is a uniform light distribution at the output of the lens system.

20 Claims, 14 Drawing Figures

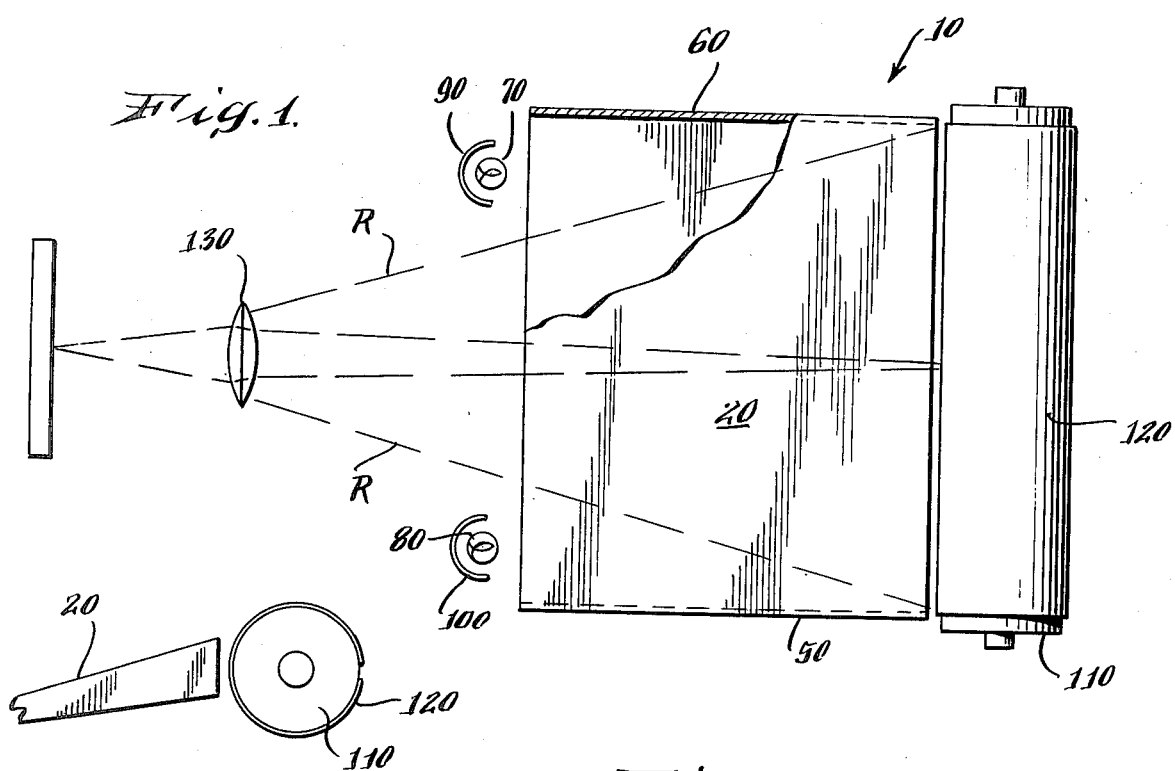
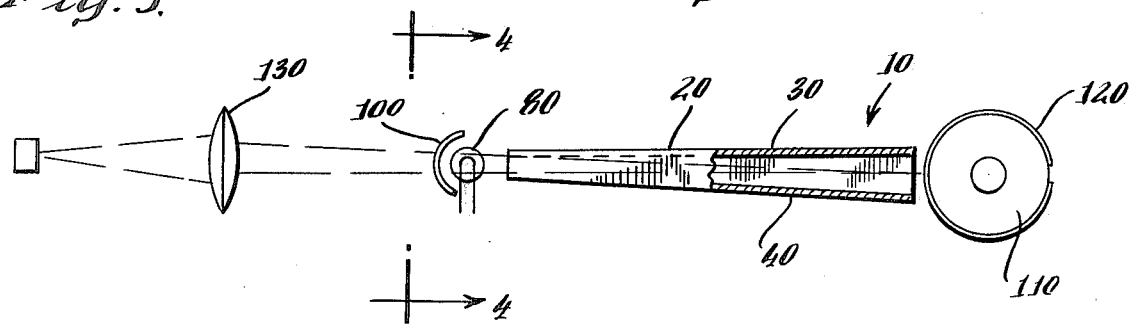
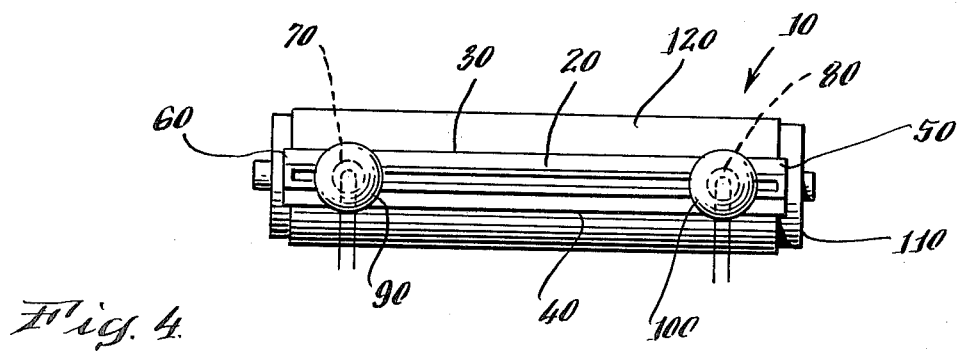

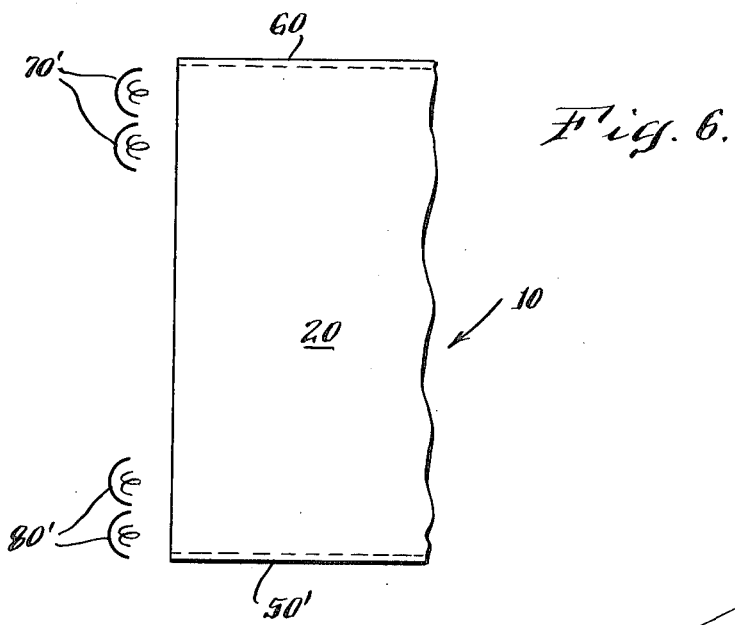
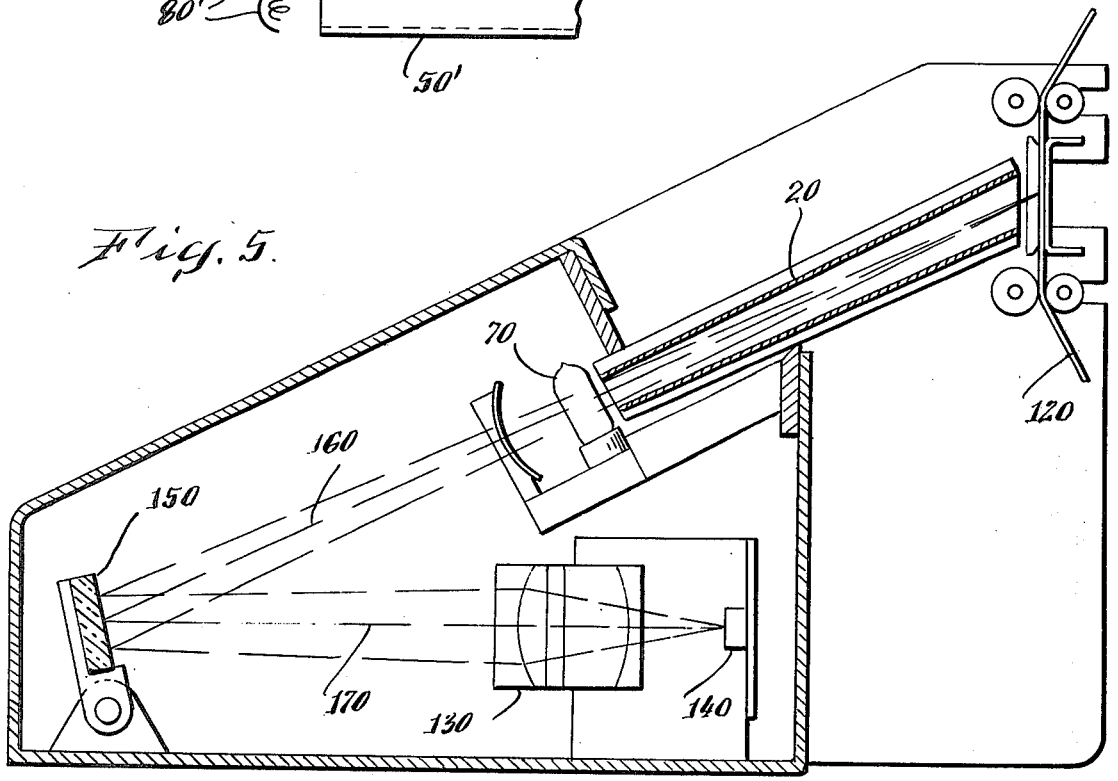
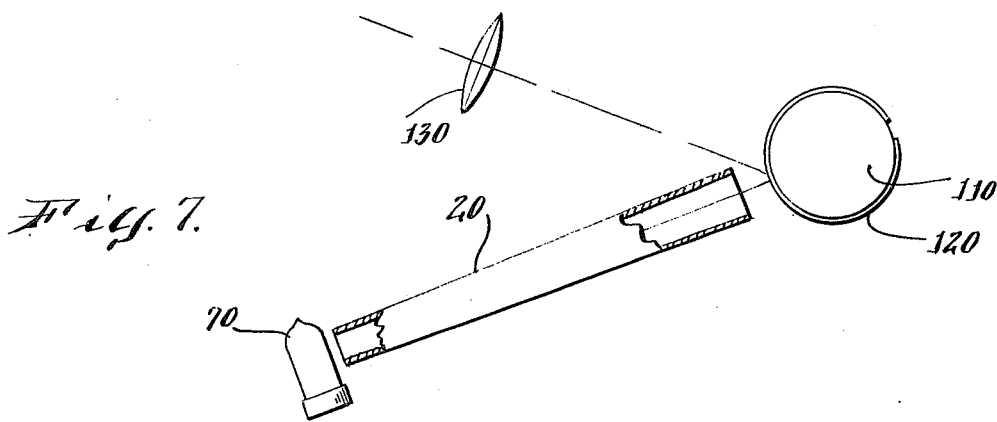

ELECTRO-OPTICAL DOCUMENT READER

BACKGROUND OF THE INVENTION

In electro-optical document-reading apparatus such as facsimile apparatus, light is directed onto a printed document, and light is reflected from each elemental area of the printed document, in accordance with the color or blackness of the elemental area. The reflected light is fed through an optical system, usually including a spherical lens system, to electrical apparatus in which the reflected light is converted to electrical signals which are used to perform a printing operation which reproduces the document. One characteristic of a spherical lens is that there is a fall-off in light intensity at the ends of the lens so that a line of light which passes through the lens is reduced in intensity at its ends and is more intense at the center. This results in imperfect reproduction of a document.

Briefly, this problem is avoided in the present invention by the provision of means for flooding a document with light having a distribution of intensity which compensates for the fall-off in the lens to provide a substantially uniform light intensity distribution at the input to the electronic circuit portion of the system.

DESCRIPTION OF THE DRAWINGS

FIG. 1 is a plan view of the invention;

FIG. 2 is a side, elevational view, partly in section, of the apparatus of FIG. 1;

FIG. 3 is a side elevational view of a portion of the apparatus of FIG. 2 showing a modification thereof;

FIG. 4 is a rear elevational view of a portion of the apparatus of FIG. 1;

FIG. 5 is a side, elevational view of a modification of the invention;

FIG. 6 is a plan view of apparatus illustrating another modification of the invention;

FIG. 7 is a side elevational view of still another modification of the invention;

DESCRIPTION OF THE PREFERRED EMBODIMENTS

Figure 8:
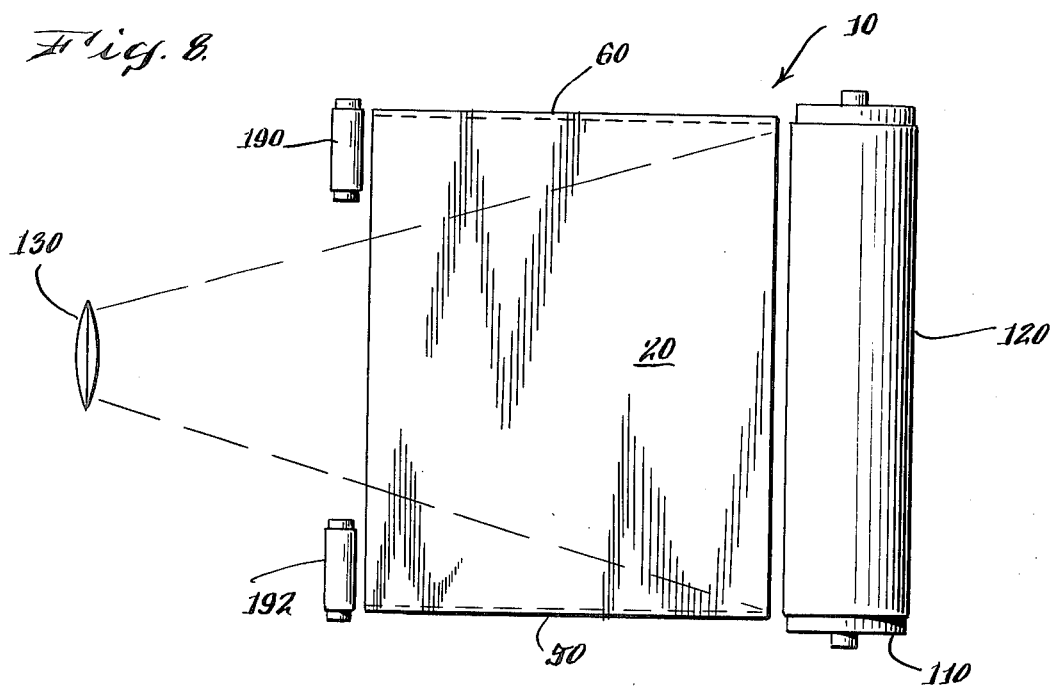
FIG. 8 is a plan view of a modification of the invention.

In general terms, the apparatus 10 embodying the invention includes a light guide 20 having a generally rectangular inlet end 22 and a generally rectangular outlet end 24. At the outlet end of the light guide is positioned means for supporting a document to be illuminated with light, line-by-line. At the inlet end of the light guide is positioned light source means for generating light to be directed through the light guide onto the document disposed across the outlet end of the light guide. The apparatus 10 also includes optical and electronic circuit means for receiving light reflected from the document, line-by-line, and converting such reflected light to electrical signals which are used to reproduce the document at a remote location.

One embodiment of the light guide 20 used in practicing the present invention is a hollow duct which is relatively long and wide but has small height and has a rectangular cross-section. In addition, the duct enlarges from the inlet end to the outlet end so that the outlet end 24 has a larger area than the inlet end 22. The light guide includes relatively large-area top and bottom plates 30 and 40 and trapezoidal side plates 50 and 60, all of which have highly reflective inner surfaces. The light guide has a width which is somewhat larger than the width of a document to be "read" in order to avoid edge effects in the light guide.

At the outlet end of the light guide and spaced a suitable distance therefrom is a rotatable cylinder 110 which carries a document 120 to be read, line-by-line, by the system. The document is positioned to receive light transmitted through the light guide and to transmit light in accordance with the reflectance of unit areas of each line of the message printed thereon, as is well known in the art. For most uses, the cylinder 110 should be as close as possible to the outlet end 24 of the light guide.

For a number of reasons, including the need to avoid reflection problems or to control the path of reflected light to pickup apparatus, the angular relationship between the optical axis of the light guide and the surface of the document may be varied, from perpendicular as illustrated in FIG. 2 to some suitable angle as illustrated in FIG. 3.

According to the invention, the apparatus 10 is provided with light source means positioned to compensate for the cosine fourth power drop-off of the reading lens system normally employed with apparatus of the type under consideration, one embodiment of which is described below. In one arrangement, the compensating light source means comprises two incandescent lamps 70 and 80 disposed close to the rear opening 22 of the light guide and positioned to direct light into the light guide and toward the document. In order to provide the desired compensation, the lamps are spaced apart, with each being disposed between the center of the rear opening and one of the side walls 50 or 60. Some of the light rays from the lamp strike the document directly, and some strike the document through reflections from the side walls and the top and bottom plates of the light guide, and the total light which reaches the document has the desired distribution of light intensity along the document. As noted, the desired light intensity distribution shows greater intensity toward the left and right edges of the document than at the center thereof. The exact positioning of the lamps to obtain the desired distribution of intensity depends on a number of mechanical and optical factors and can be readily determined by those skilled in the art.

It is further noted that, in one mode of operation of the apparatus 10 wherein light reflected from the document is directed back through the light guide to pick up or reading apparatus to be described, the lamps 70 and 80 must be spaced apart sufficiently to permit all useful light up to and including the limiting rays R (FIG. 1) to exit from the end 22 of the light guide.

In order to improve the efficiency of the lamps 70 and 80 and increase the flexibility of adjustment thereof, adjustable concave reflectors 90 and 100 are positioned one behind each lamp. The reflectors should be properly positioned and angled with respect to the lamps so that light reflected therefrom is not obstructed by the lamp filaments or other parts thereof. Of course, the reflectors are also positioned to assist in achieving the desired distribution of light intensity along the document.

In one embodiment of the invention wherein light reflected from the document is fed back through the light guide, the pickup portion of the apparatus 10 includes a spherical, aberration-free lens system 130 mounted behind and between the lamps 70 and 80 to receive light reflected from the document 120. Behind the lens 130, is positioned a photoelectric sensor 140 for converting light reflected from each unit area of a line of print on the document to electrical signals, as is well known in the art. One suitable photoelectric device comprises an integrated circuit chip having a large number of tiny photosensitive elements arranged in a line, each element receiving light from a unit area of each line of print.

It is noted that the light distribution along the document generated by the lamp (and reflectors) combines with the distribution generated by the lens 130 to provide a substantially uniform light distribution at the input to the electronics of the system.

A modification of the apparatus 10 shown schematically in FIG. 5, provides a longer optical path than the apparatus of FIG. 1, if such is required. The apparatus in FIG. 5 includes a folding mirror 150 which is disposed rearwardly of the lamps to receive light reflected from the document along a first axis 160, this light being reflected on a second axis 170 disposed at a suitable angle to the first. This light is directed through the lens 130 to the photoelectric sensor 140.

Those skilled in the art will appreciate that the mechanical parameters selected for the light guide are determined by, among other things, the size of the light guide, the spacing of the document from the outlet end of the light guide, the intensity of the light which reaches the document, the size of the document, the lamp filament size, the lamp bulb size, and the like. In one embodiment of the invention wherein the spacing of the document from the guide opening 24 was about four inches and the light guide had a length of about eleven inches., the top and bottom plates of the light guides were disposed at an angle to the horizontal of about 1° to about 1.5°.

In a modification of the apparatus described above, each of the lamps 70 and 80 is replaced by two or more lamps 70' and 80', as illustrated in FIG. 6. The lamps 70' and 80' are positioned to satisfy all of the requirements spelled out for lamps 70 and 80.

Figure 9:
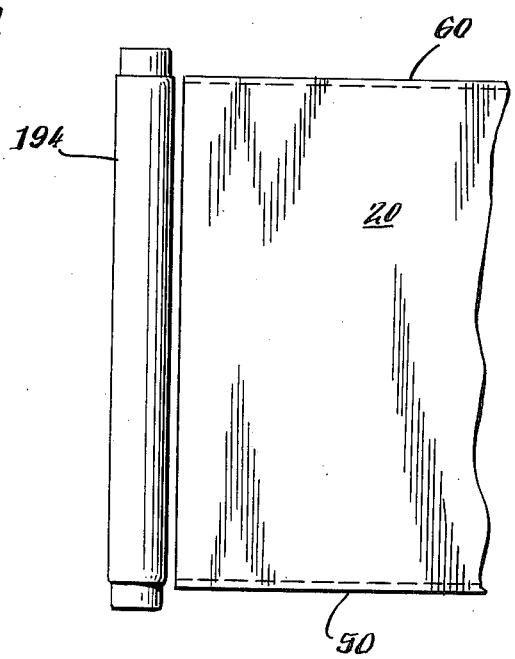
FIG. 9 is a plan view of another modification of the invention.
Figure 10:
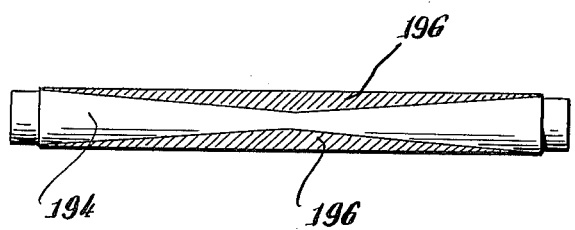
FIG. 10 is a front view of a portion of the apparatus of FIG. 9.

In another modification of the apparatus of the invention, light reflected from the document 120 does not return through the light guide but travels along a path disposed outside the light guide. Thus, as illustrated in FIG. 7, the light guide 20 is disposed at such an angle to the document that light is reflected from the document on an axis 180 which is disposed above the light guide to suitable optical apparatus and electro-optical pickup mechanism (not shown). With this type of reading arrangement, the lamps 70 and 80 can be replaced by two separate spaced-apart fluorescent bulbs 190 and 192 or by a single fluorescent bulb 194 (FIG. 9) suitably masked by an opaque coating 196 (FIG. 10) to provide greater output at its ends than at its center. With this arrangement, a single source of light is provided, which represents economies while the desired light distribution is achieved. On of the important advantages of using one or more fluorescent bulbs resides in the fact that the bulbs can be placed directly against the open end of the light guide to provide optimum optical efficiency.

Figure 11:
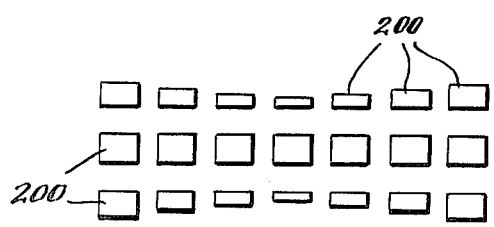
FIG. 11 is a front view of a modified light source used with the invention.

In still other modifications of the invention, the light sources might comprise electroluminescent panels, or they might be light-emitting diodes 200 shaped and disposed to achieve the desired light distribution as shown schematically in FIG. 11, wherein there is a greater concentration of light-emitting devices at the ends than at the center.

Figure 12:
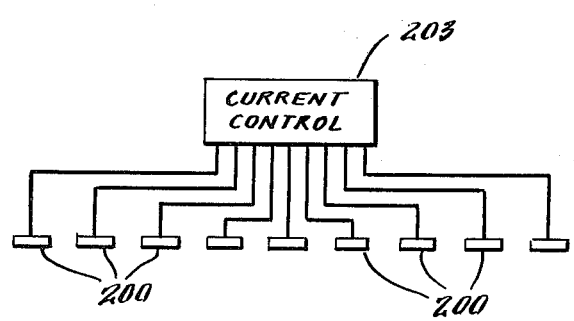
FIG. 12 is a schematic representation of another modification of a light source used with the invention.
Figure 13:
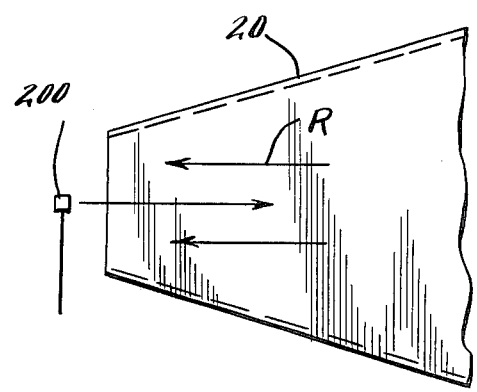
FIG. 13 is a side view of apparatus using the apparatus of FIG. 12.

Alternatively, a single row of separate light-emitting devices 200 might be connected to current control means 203 whereby different light output is obtained from the devices at the ends than at the center of the series. This is illustrated in FIG. 12. In this arrangement, in addition, the devices 200 are narrow, line-like devices which allow light R to return back through the light guide 20 from the document to the reading lens 130 and electronic pickup apparatus (not shown) as illustrated in FIG. 13.

Figure 14:
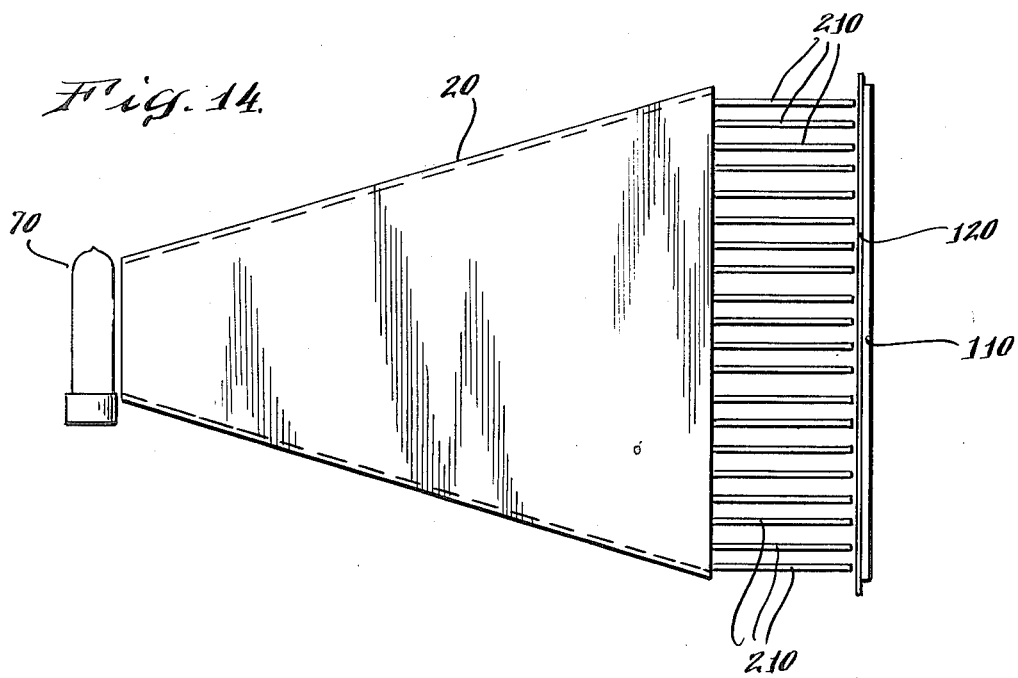
FIG. 14 is a side elevational view of another modification of the invention.

In another modification of the invention illustrated in FIG. 14, an assembly of optical fibers 210 is disposed between the outlet end of the light guide 20 and the document 120. Each optical fiber may be of the order of one to two inches in length. The assembly provides improved optical efficiency.

It is clear that the principles of the invention may be applied, not just to facsimile, but to photography in general or to other optical fields which have the problems solved by the invention.

What is claimed is:

1. Optical apparatus comprising
   a light guide having a first end and a second end,
   document-supporting means, at one of said ends of said light guide, said document-supporting means being positioned to receive and reflect light rays from a document carried thereby,
   light-generating means at the other end of said light guide, said light-generating means being positioned and disposed to direct light into said light guide and provide non-uniform distribution of light intensity along said document at said one end of said light guide, and
   utilization means, including optical means, positioned to receive reflected light reflected from said document back through said light guide, said optical means having a non-uniform transmission characteristic which is compensated for by the non-uniform distribution of intensity of said light from said light-generating means.

2. The apparatus defined in claim 1 wherein said light guide is generally rectangular in cross-section, and wherein the area of said second end is larger than the area of said first end, and said light guide is tapered in height from said small first end to said larger second end.

3. The apparatus defined in claim 1 wherein said light-generating means comprises at least two sources of light spaced from each other at said first end of said light guide.

4. The apparatus defined in claim 1 wherein said light-generating means comprises two pairs of lamps, said pairs of lamps being spaced apart at said first end of said light guide.

5. The apparatus defined in claim 1 wherein said light guide is disposed at an angle to said document-supporting means.

6. The apparatus defined in claim 1 wherein said light-generating means comprises two fluorescent lamps aligned at said first end of said light guide and spaced apart from each other to provide, between them, a space through which light reflected from said document can pass.

7. The apparatus defined in claim 1 wherein said light-generating means comprises a fluorescent lamp which extends across the entire width of said light guide at said first end, said fluorescent lamp being treated to emit more light at its ends than at its central portion.

8. The apparatus defined in claim 7 wherein said lamp has its surface masked to provide greater output at its ends than at its center.

9. The apparatus defined in claim 1 wherein said light-generating means comprises an array of light-emitting diodes extending across the width of said light guide at said first end, there being a larger number of said first diodes near the ends of said first end of said light guide whereby more light is generated at the ends of said array than near the center thereof.

10. The apparatus defined in claim 1 wherein said light-generating means comprises a series of light-emitting diodes disposed across the width of said light guide at said first end thereof, and electronic circuit means coupled to said light-emitting diodes for modulating the current to each and the light output from each.

11. The apparatus defined in claim 1 and including an array of optical fibers disposed between said second end of said light guide and said document-supporting means.

12. The apparatus defined in claim 1 wherein said light guide is hollow and said first and second ends are open.

13. The apparatus defined in claim 1 wherein said light guide is solid and comprises a light-transmissive material.

14. The apparatus defined in claim 1 wherein said light guide is in the form of a duct having a rectangular cross-section with a rectangular inlet end and a rectangular outlet end, with the duct enlarging from the inlet end to the outlet end so that the outlet end has a larger area than the inlet end.

15. The apparatus defined in claim 1 wherein said light guide is hollow and its inner surface is highly reflective.

16. The apparatus defined in claim 1 wherein said optical means is positioned to receive light reflected from said document and away from said light guide.

17. The apparatus of claim 1 wherein said reflected light is disposed in generally linear form corresponding to a line of print on said document.

18. Optical apparatus comprising
a light guide having a first end and a second end,
document-supporting means, at one of said ends of said light guide, said document-supporting means being positioned to receive and reflect light rays from a document carried thereby,
light-generating means at the other end of said light guide, said light-generating means being positioned and disposed to direct light into said light guide and provide non-uniform light distribution along said document at said one end of said light guide,
optical means positioned adjacent to said first end of said light guide to receive light reflected back through said light guide from said document, said optical means having a non-uniform transmission characteristic which is compensated for by the non-uniform distribution of said light from said light-generating means, and
electronic circuit means positioned to receive the light output from said optical means for converting said light output to electrical signals representative of the printed matter carried by said document.

19. Optical apparatus comprising
a light guide having a first end and a second end,
document-supporting means, at one of said ends of said light guide, said document-supporting means being positioned to receive and reflect light rays from a document carried thereby,
light-generating means at the other end of said light guide, said light-generating means being positioned and disposed to direct light into said light guide and provide non-uniform light distribution along said document at said one end of said light guide, and
utilization means, including optical means, having at least a portion at said other end of said light guide and positioned to receive light reflected back through said light guide from said document, said optical means having a non-uniform transmission characteristic which is compensated for by the non-uniform distribution of said light from said light-generating means, said light passing by way of said optical means to said utilization means.

20. Optical apparatus comprising
a light guide having a first end and a second end,
document-supporting means, at one of said ends of said light guide, said document-supporting means being positioned to receive and reflect light rays from a document carried thereby,
light-generating means at the other end of said light guide, said light-generating means being positioned and disposed to direct light into said light guide and provide non-uniform light distribution along said document at said one end of said light guide, said light-generating means comprising separate light sources spaced apart to provide a space between them, and
utilization means, including optical means, positioned to receive light reflected from said document, said optical means having a non-uniform transmission characteristic which is compensated for by the non-uniform distribution of said light from said light-generating means, at least a portion of said optical means being positioned between said light sources to receive light reflected back from said document through said light guide.

* * * * *